United States Patent
Willis et al.

(10) Patent No.: US 9,841,750 B2
(45) Date of Patent: Dec. 12, 2017

(54) DYNAMIC REAL-TIME SLICE ENGINE FOR 3D PRINTING

(71) Applicant: Autodesk, Inc., San Rafael, CA (US)

(72) Inventors: Karl Willis, Millbrae, CA (US); Ryan Michael Schmidt, Toronto (CA); Baoxuan Xu, Vancouver (CA)

(73) Assignee: Autodesk, Inc., San Rafael, CA (US)

( * ) Notice: Subject to any disclaimer, the term of this patent is extended or adjusted under 35 U.S.C. 154(b) by 282 days.

(21) Appl. No.: 14/711,654

(22) Filed: May 13, 2015

(65) Prior Publication Data

US 2015/0328839 A1 Nov. 19, 2015

Related U.S. Application Data

(60) Provisional application No. 61/992,617, filed on May 13, 2014.

(51) Int. Cl.
*B29C 67/00* (2017.01)
*G05B 19/4099* (2006.01)
*B33Y 50/02* (2015.01)

(52) U.S. Cl.
CPC ...... *G05B 19/4099* (2013.01); *B29C 67/0088* (2013.01); *B33Y 50/02* (2014.12)

(58) Field of Classification Search
CPC .. G05B 19/4099; B29C 67/0088; B33Y 50/02
See application file for complete search history.

(56) References Cited

U.S. PATENT DOCUMENTS

| 5,137,662 A | 8/1992 | Hull et al. |
| 9,120,270 B2 | 9/2015 | Chen et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,360,757 B2 | 6/2016 | DeSimone et al. |

(Continued)

FOREIGN PATENT DOCUMENTS

WO WO 2014/126830 8/2014

OTHER PUBLICATIONS

Dendukuri et al., "Continuous-flow lithography for high-throughput microparticle synthesis," Nature Materials, vol. 5, May 2006, pp. 365-369, © 2006 Nature Publishing Group.

(Continued)

*Primary Examiner* — Charles Kasenge
(74) *Attorney, Agent, or Firm* — Fish & Richardson P.C.

(57) ABSTRACT

Methods, systems, and apparatus include computer programs encoded on a computer-readable storage medium, including a method for 3D printing without preprocessing a CAD model before delivery to a 3D printer. The CAD model for a design to be printed is received by a 3D printer. Instructions are generated for printing the first slice. While the instructions are used to start printing the CAD model, dynamic real-time slicing is performed on a remaining portion of the CAD model. Preprocessed data, model analysis information or real-time feedback is received during the printing of a respective slice. A next slice is identified, and slicing parameters are adjusted, including adjusting a slicing parameter for the next slice. Instructions for printing the next slice are generated. The next slice is printed based on the generated instructions. Dynamic real-time slicing is repeated to generate a then next slice and associated printing instructions.

14 Claims, 6 Drawing Sheets

(56) References Cited

U.S. PATENT DOCUMENTS

| | | | |
|---|---|---|---|
| 2007/0264481 | A1 | 11/2007 | DeSimone et al. |
| 2010/0028994 | A1 | 2/2010 | DeSimone et al. |
| 2010/0125356 | A1* | 5/2010 | Shkolnik ............. B29C 67/0088 700/98 |
| 2011/0182805 | A1 | 7/2011 | DeSimone et al. |
| 2012/0285019 | A1* | 11/2012 | Schechner ......... A61C 13/0004 29/896.1 |
| 2013/0252178 | A1 | 9/2013 | McLeod et al. |
| 2013/0336884 | A1 | 12/2013 | DeSimone et al. |
| 2014/0272121 | A1* | 9/2014 | Ng ..................... B29C 33/3842 427/133 |
| 2014/0339741 | A1 | 11/2014 | Aghababaie et al. |
| 2015/0072293 | A1 | 3/2015 | DeSimone et al. |
| 2015/0097315 | A1 | 4/2015 | DeSimone et al. |
| 2015/0097316 | A1 | 4/2015 | DeSimone et al. |
| 2015/0102532 | A1 | 4/2015 | DeSimone et al. |
| 2015/0331402 | A1 | 11/2015 | Lin et al. |
| 2015/0360419 | A1 | 12/2015 | Willis et al. |
| 2016/0067921 | A1 | 3/2016 | Willis et al. |

OTHER PUBLICATIONS

Lambert et al., "Design considerations for mask projection microstereolithography systems," (Jun. 22, 2016) [online] (retrieved from http://sffsymposium.engr.utexas.edu/Manuscripts/2013/2013-09-Lambert.pdf), 20 pages.

Massey, "Permeability Properties of Plastics and Elastomers — A Guide to Packaging and Barrier Materials," Published Jan. 1, 2003. pp. 1-5, 19-29.

Pan et al., "Rapid manufacturing in minutes: the development of a mask projection stereolithography process for high-speed fabrication," Proceedings of the ASME 2012 International Manufacturing Science and Engineering Conferences, Jun. 4-8, 2012, Notre Dame, Indiana, US, 10 pages.

Pinnau and Toy, "Gas and vapor properties of amorphous perfluorinated copolymer membranes based on 2,2-bistrifluoromethyl-4,5-difluoro-1,3-dioxole/tetrafluoroethylene," Journal of Membrane Science, 109:125-133 (1996).

Unknown author, "Teflon™ AF amorphous fluoroplastic resins," (Jun. 22, 2016) [online] (retrieved from https://www.chemours.com/Teflon_Industrial/en_US/assets/downloads/teflon-af-product-information.pdf), 3 pages.

Unknown author, "DuPont™ Teflon® AF amorphous fluoroplastic resin," (Jun. 22, 2016) [online] (retrieved from http://www2.dupont.com/Teflon_Industrial/en_US/assets/downloads/h44587.pdf), 4 pages.

Zhang, "Teflon AF composite materials in membrane separation and molecular recognition in fluorous media," Ph.D. dissertation, University of Pittsburgh, 2013, 207 pages.

* cited by examiner

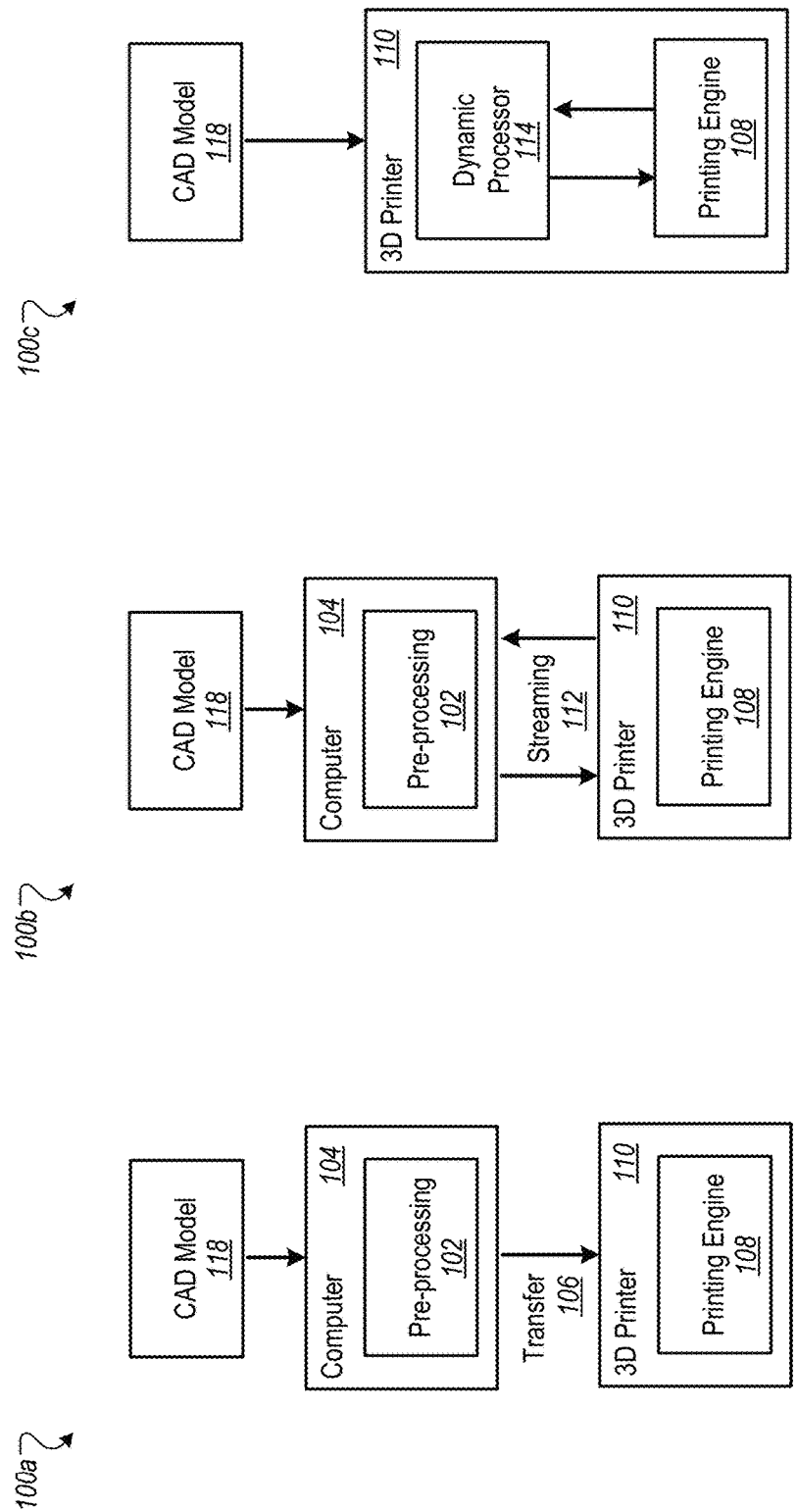

US 9,841,750 B2

DYNAMIC REAL-TIME SLICE ENGINE FOR 3D PRINTING

CROSS-REFERENCE TO RELATED APPLICATION

This application claims priority to U.S. Provisional Application No. 61/992,617, filed on May 13, 2014. The disclosure of the prior application is considered part of and is incorporated by reference in the disclosure of this application.

BACKGROUND

This specification relates to three-dimensional (3D) printing.

3D printers use a variety of processes and materials for producing a 3D object. Materials used can be of the form of a resin (e.g., plastic) or other material that can be deposited so as to produce a desired 3D shape. A process of printing a 3D object can include, for example, printing a series of layers, each layer being two-dimensional (2D).

SUMMARY

In general, a method and system are provided for 3D printing that does not require external pre-processing of a computer-aided design (CAD) model to be printed, but rather provides real time parallel processing and printing functionality. A method includes receiving, by a 3D printer, a CAD model for a design to be printed by the 3D printer. The method further includes processing the CAD model to identify a first slice and generating instructions for printing the first slice. The method further includes using the generated instructions to start printing of the CAD model. The method further includes, in parallel with the printing, performing dynamic real-time slicing on a remaining portion of the CAD model. The dynamic real-time slicing includes receiving pre-processed data, model analysis information or real-time feedback during the printing of a respective slice or after the printing of one or more previous slices. The dynamic real-time slicing further includes identifying a next slice for printing including adjusting one or more slicing parameters based on the received pre-processed data, model analysis information or real-time feedback. Adjusting includes adjusting a slicing parameter for the next slice to be printed by the 3D printer. The dynamic real-time slicing further includes generating instructions for printing the next slice. The method further includes printing the next slice based on the generated instructions and, in parallel, repeating the performing dynamic real-time slicing to generate a then next slice and associated instructions for printing.

These and other implementations can each optionally include one or more of the following features. Adjusting one or more slicing parameters can include adjusting a slice thickness based on one or more of CAD model geometry or user input including slicing at least two different slice thicknesses when printing the CAD model. Adjusting the slice thickness can include increasing a slice thickness for a next slice to be greater than a slice thickness for a last-printed slice when printing a wall. Adjusting the slice thickness can include decreasing a slice thickness for a next slice to be less than a slice thickness for a last-printed slice when printing a curve. The user input can be received after the start of printing and can control a speed at which a remaining portion of printing occurs, with higher speed resulting in greater thickness slices. The method can further include processing an image taken from a camera including identifying one or more calibration errors and adjusting an alignment of a next slice. The method can further include identifying one or more delicate features in the CAD model that may result in print unreliability, and adjusting can include increasing a next slice thickness to increase print reliability and accordingly not printing the identified delicate features. The method can further include detecting an anomaly in a slice, determining a default configuration for the detected anomaly, and applying the default to the generated instructions to ensure no print error occurs when printing the CAD model. Adjusting one or more slicing parameters can include determining a default setting for at least one of the slicing parameters to print a first slice, and adjusting the at least one slicing parameter at a next slice or a subsequent slice based on feedback obtained during printing or an evaluation of the CAD model.

Particular implementations may realize none, one or more of the following advantages. Printing can occur directly from an original CAD model without the need for an external pre-processing. Printing can be started before all pre-processing of a CAD model is performed. Print speed can be manually adjusted by a user before or during a print. Slicing and instruction set generation can be performed in parallel to printing for at least a portion of the CAD model. Slice thickness can be automatically varied based on CAD model geometry and information determined when printing previous slices. Real time corrections can be made to compensate for detected anomalies, such as a result of mis-alignment or ambient conditions (e.g., temperature, humidity, build up of material on the print nozzle, cloudiness of the print window, vibration or movement of the printer body/platform).

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-1B show two prior art systems for 3D printing.

FIG. 1C shows an example system for 3D printing in accordance with this specification.

Like reference numbers and designations in the various drawings indicate like elements.

DETAILED DESCRIPTION

Figure 1D:
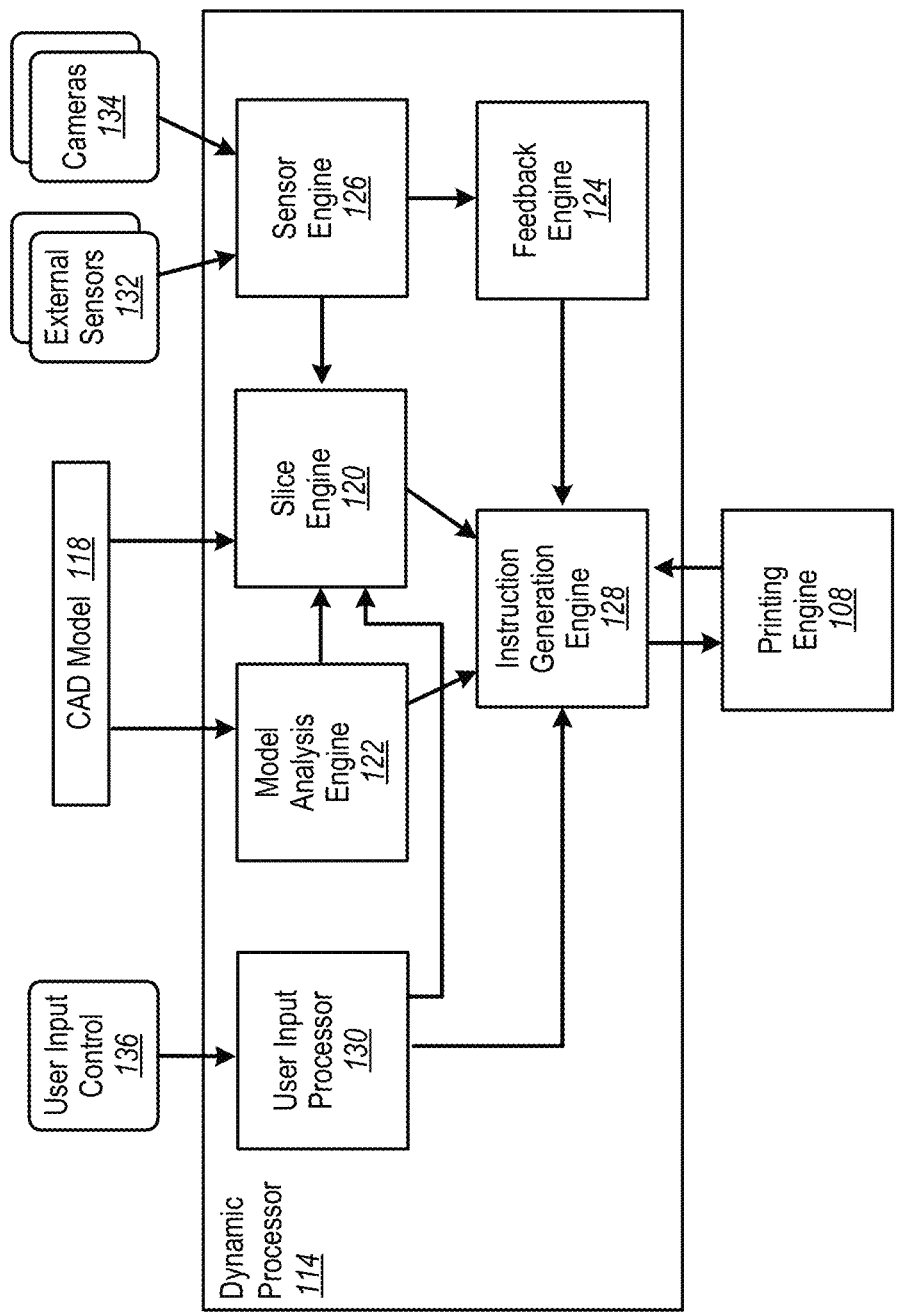
FIG. 1D shows an architecture associated with functional elements performed by the dynamic processor of FIG. 1C.

Systems, methods, and computer program products are described for 3D printing without the necessity to externally pre-process a computer-aided design (CAD) model before delivery to a 3D printer. For example, 3D Printing, also known as Additive Manufacturing, is the process of additively fabricating a physical object from sequential layers. In the typical process, a CAD model is prepared and pre-processed to create an instruction set that the printer can read. This pre-processing typically consists of generating bitmap or vector data that defines where material should be deposited, cured, bound, or otherwise fabricated.

The practice of pre-preprocessing CAD models can have a number of disadvantages. For example, a slow processing time can result, as all preprocessing is done up front (i.e., before any portion of the underlying model is printed). In another example, a failure in pre-preprocessing a CAD model can prevent printing from even starting. Another example disadvantage is that preprocessed instructions are unable to accommodate dynamic feedback from the 3D printer during the print (e.g., such as related to detected or ambient conditions). In some implementations, these and other disadvantages can be solved, for example, by performing dynamic real-time slicing on the 3D printer itself, e.g., during the print.

Existing systems typically can take one of two approaches to process a CAD model into a 3D printer ready instruction set. In a first approach, for example, an entire model can be pre-processed and transferred to the 3D printer in advance of the 3D print. In this approach, for example, the entire instruction set can be stored in memory on the 3D printer, and the instructions can be carried out sequentially (as is represented by a prior art system shown in FIG. 1A). In a second approach, for example, a subset of slice instruction data can be pre-processed and streamed to the 3D printer from a network/attached computer. In this approach, the printer can store a given subset of data in a local buffer, and new data can be requested and received as layers of the print are completed (as is represented by a prior art system shown in FIG. 1B, where acknowledgement is sent back to the pre-processor that only indicates completion of a last printed portion of the stream as opposed to any other type of feedback).

FIGS. 1A-1B show two prior art example systems 100a-100b for 3D printing. For example, in the system 100a, a 3D printing workflow uses pre-processing 102 (e.g., at a computer 104) and transfer 106 of completed instructions (e.g., for use by a printing engine 108 at a 3D printer 110). System 100b, for example, pre-processes the model and streams (112) instructions to the 3D printer 110. FIG. 1C shows an example system 100c, for example, that uses a dynamic processor 114 on the 3D printer 110 for real time slicing and instruction generation that is performed in parallel with printing, which is a subject of this disclosure. For example, in the system 100c, printing engine 108 can operate directly on the original CAD model 118 by dynamically slicing and processing the instruction set on the 3D printer 110 itself.

In some implementations, dynamic slicing and instruction set generation can enable a slice engine to adjust various slicing parameters in response to either pre-processed data, model analysis, or real-time feedback. Using this input data, for example, the slice engine output can be dynamically adapted in numerous ways.

FIG. 1D shows an example architecture associated with the dynamic processor 114 of FIG. 1C. In the example shown, the dynamic processor 114 can include plural engines 120-130. In some implementations, each engine can be of the form of software instructions executed on one or more processors, dedicated hardware, firmware or combinations of the same. Other configurations and engines of the dynamic processor 114 are possible.

A slice engine 120, for example, can determine slices to be printed using information from the CAD model 118, a model analysis engine 122, and user inputs from a user input processor 130. The slice engine 120 can also base its determining on information received from a sensor engine 126. Information associated with the determined slices (e.g., slice geometry) can be provided as an input to an instruction generation engine 128.

The model analysis engine 122, for example, can analyze the received CAD model 118 for an object to be printed and provide information to the either or both the slice engine 120 and the instruction generation engine 128 so as to enable adjustment of various print parameters (including slice parameters and/or instruction generation parameters) during the print process.

The sensor engine 126, for example, can receive information from external sensors 132 (e.g., temperature sensor, humidity sensor, alignment sensor) and cameras 134 on the 3D printer and provide information associated with sensed conditions and images to the feedback engine 124, or directly to slice engine 120 and instruction generation engine 128 (e.g., so as to enable dynamic adjustment of print parameters).

The feedback engine 124, for example, can receive and process information from a user (by way of a mechanical or software control), sensors or the model analysis engine and provide feedback, such as a result of processing and printing a first set of plural layers for the model, to one or both of the slice engine 120 and the instruction generation engine 128.

The instruction generation engine 128, for example, can use information received from the model analysis engine 122, the slice engine 220, the feedback engine 124 and the user input processor 130 to generate printing instructions to be provided to the printing engine 108.

The user input processor 130, for example, can receive signals or other inputs from a user input control 136 (e.g., on the 3D printer or from another source), including information to be provided to the slice engine 120 and the instruction generation engine 128 to control printing.

Figure 2B:
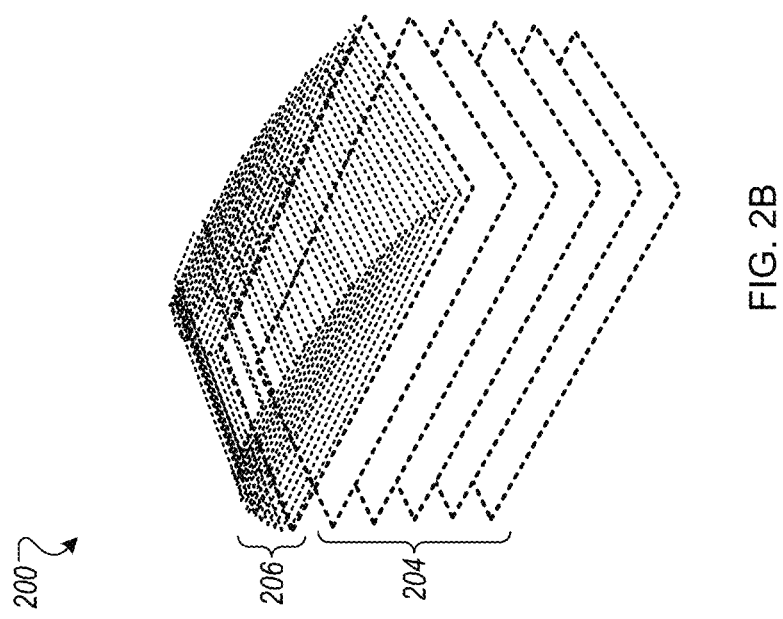
FIGS. 2A-2B collectively show an example generation of variable thickness slices.
Figure 2A:
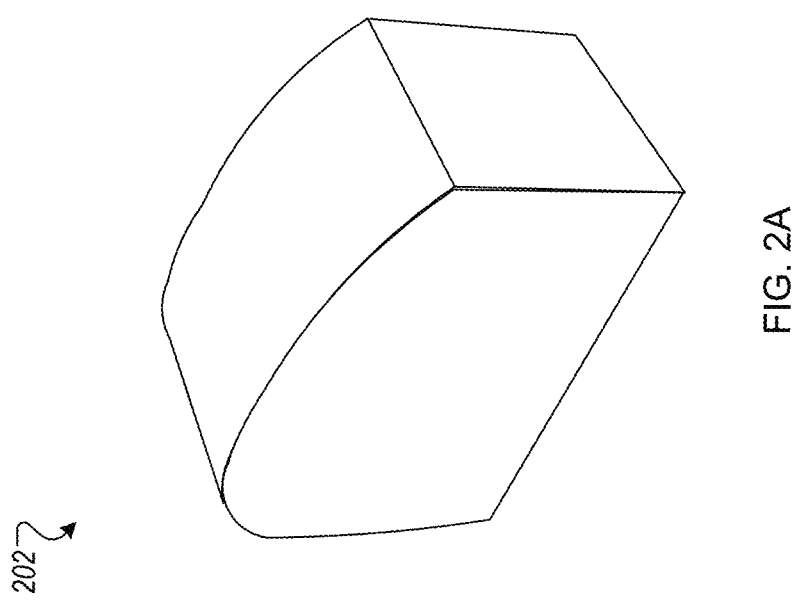

FIGS. 2A-2B collectively show an example generation of variable thickness slices 200. Variable thickness slices 200 can be produced dynamically, for example, in real-time based on model geometry 202 or user input. Specifically, the variable thickness slices 200 are sized to conform to the model geometry 202. Also, the thickness of the slices can depend on variability in the model geometry 202. For example, larger thickness slices 204 can be used in places where the model geometry 202 remains relatively unchanged (e.g., in straight-walled portions). Smaller thickness slices 206 can be used, for example, in places where the model geometry 202 changes (e.g., in curves). In contrast to conventional slice engines, for example, that slice at a constant thickness, a dynamic slice-engine can output variable thickness slices 200 in response to incoming data. The data may take the form of real-time input (e.g., from a sensor or button), pre-processed metadata embedded in the CAD model, or dynamic analysis of the model. Variable thickness slices 200 may be desirable, for example, if certain areas of a CAD model require finer detail and other areas do not. For example, shallow curves may benefit from reduced layer thickness so as to reduce the prominence of steps forming in the physical print. Other simpler geometries, such as vertical walls, can be printed with thicker layers to speed up the print.

In some implementations, variable thickness slices 200 can also be used to adjust the speed of the print after the print has started. For example, a dial or other control may be presented to the user that, upon selection, increases the layer thickness and reduces the total print time. In some implementations, a user input is provided to allow for manual adjustment of the print process, such as to increase or decrease print speed. The manual control can be the form of a knob or selector for selecting or adjusting a parameter that controls slice thickness. Feedback can be provided to the user after input is received indicating, for example, time difference or remaining time required to print the CAD model given the change in the parameter setting.

In some implementations, the dynamic slicer can adjust the output (e.g., the bitmap or vector-based instruction set data) during the print based on pre-processed data, model analysis, or real-time feedback. For example, based on feedback from a camera, the alignment of a particular slice can be adjusted to compensate for calibration errors or for other reasons (e.g., based on an evaluation of one or multiple previously printed layers with their intended shape). In another example, delicate features that are considered too thin for printing may be adjusted (e.g., thickened or removed) to increase print reliability. Further, one or more sensors may be included or associated with the print environment. Sensors (or a camera) may be used to detect ambient temperature, ambient humidity, build-up of material on a print nozzle, cloudiness of a print window, movement or vibration of a print structure (e.g. the print platform). Feedback from the sensors can be provided to the dynamic processor 114 so as to enable adjustments to the print process for subsequent slices (e.g., to adjust slice thickness, another parameter or the instructions associated with the print process for next slices that are to be printed). In some implementations, feedback can be processed over time, such as to allow for adjustments to be made based on an evaluation of a plurality of previously printed layers. In some implementations, feedback can represent an average (mathematical or otherwise) over a plurality of previously printed layers.

In some implementations, a dynamic real-time slice engine (e.g., as part of the dynamic processor 114) can be implemented inside the 3D printer hardware itself. For example, a slice engine included in the dynamic processor 114 in the 3D printer 100*c* can receive a CAD model directly as input, e.g., as shown in FIG. 1C. The slice engine, for example, can generate slices dynamically from the CAD model during/in parallel with portions of the printing process.

Figure 3:
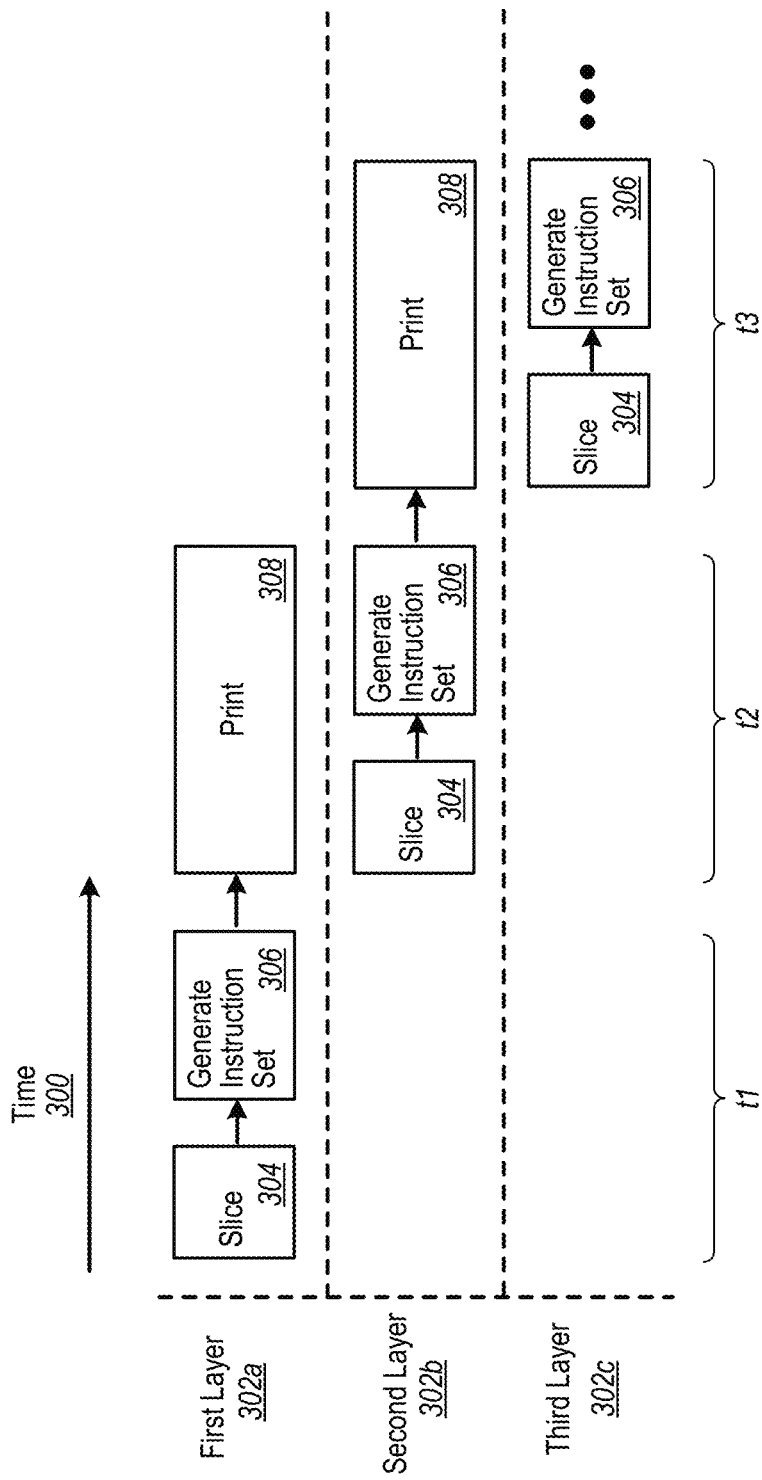
FIG. 3 shows an example of a flow for slice and instruction set generation in a 3D printer.

FIG. 3 shows an example of slicing and instruction set generation performed in parallel to printing. For example, an initial slice of the CAD model may be processed (including slicing and instruction generation) over an initial time period t1. Printing of the initial slice can occur over time period t2. For example, in parallel to a print 308 for the first layer 302*a* in time t2, slicing 304 and instruction set generation 306 can occur for the second layer 302*b*. Subsequently, in parallel to a print 308 for the second layer 302*b* in time t3, slicing 304 and instruction set generation 306 can occur for the third layer 302*c*, and so on for the other layers. Other patterns of time delays and parallel processing can be used.

In some implementations, error handling can be used in printing. For example, because slicing and instruction set generation can be performed in real-time during the print, robust error handling can be used to ensure that any CAD geometry can be printed. Typical 3D printers may have only a limited range of acceptable 3D geometry. As such, failure cases commonly include (but are not limited to) inverted normals, intersecting triangles, self-intersection, non-manifold surfaces, among other errors. In some implementations, abnormalities in the input CAD model data can be handled by the dynamic processor 114 to produce a printable instruction set. In cases in which the CAD model abnormalities are ambiguous as to the correct way to print, the processor can analyze the model to decide a default configuration. For example, if the slice engine encounters a model with significant holes, it can decide between printing the model as a solid or as a shell with a given wall thickness. In some implementations, the processor can be implemented in such a way as to minimize failure (e.g., a situation in which printing does not complete).

Figure 4:
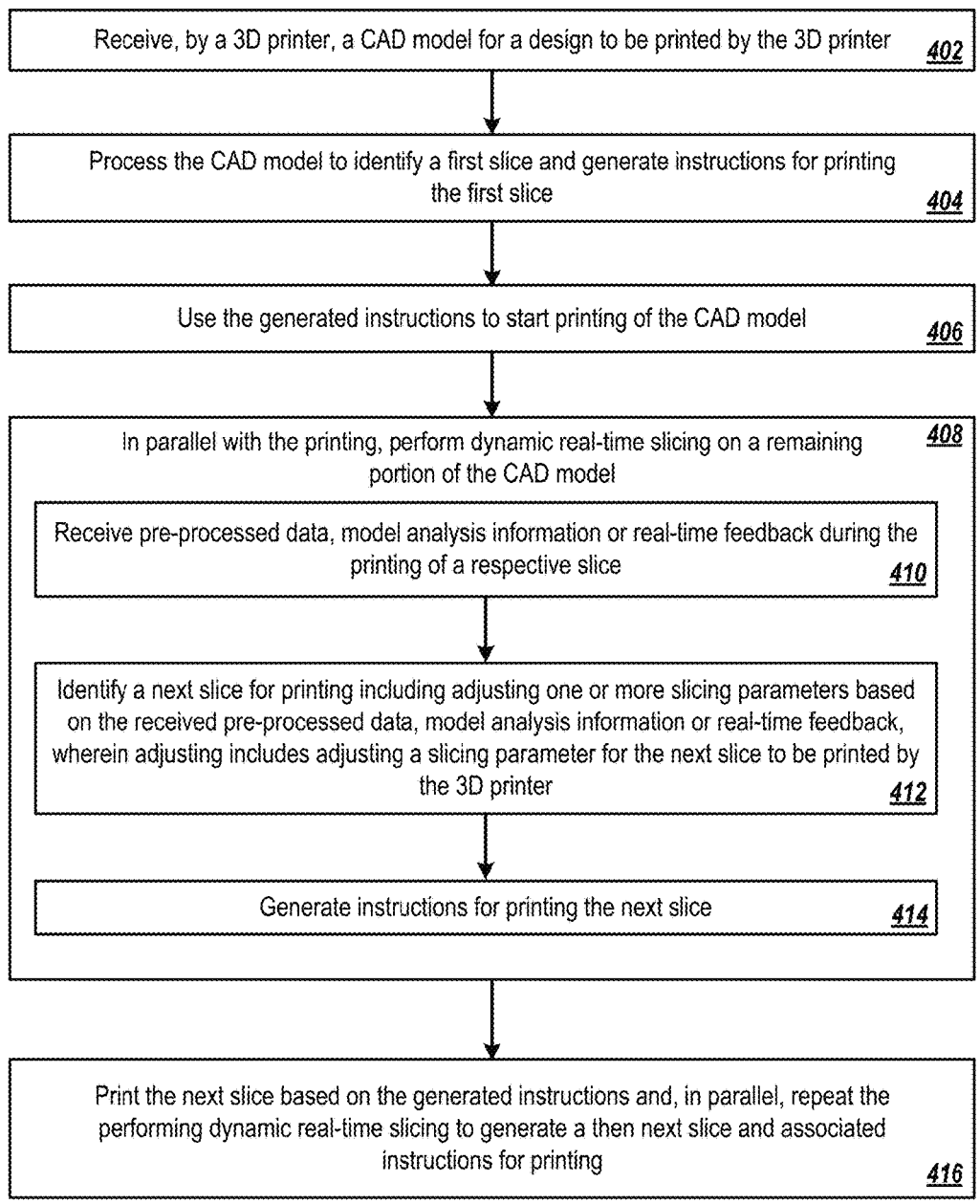
FIG. 4 is a flowchart of an example process for 3D printing.

FIG. 4 is a flowchart of an example process 400 for 3D printing. The 3D printing can occur, for example, without the necessity to pre-process a CAD model before delivery to a 3D printer. FIGS. 1A-3 are used to provide example structures for performing the steps of the process 400.

A CAD model is received by a 3D printer, the CAD model for a design to be printed by the 3D printer (402). For example, referring to FIG. 1C, the 3D printer 110 can receive the CAD model 118.

The CAD model is processed to identify a first slice, and instructions are generated for printing the first slice (404). As an example, referring to FIG. 2, the dynamic processor 114 can identify a first one of the variable thickness slices 200, such as the bottom slice associated with the model geometry 202. The initial slice may be selected based on one or more default settings, such as a default thickness.

The generated instructions are used to start printing of the CAD model (406). For example, the dynamic processor 114 can pass instructions associated with the slice to the printing engine 108. The printing of the first slice can beginning while a next slice of the model is identified and instructions are generated.

In parallel with the printing, dynamic real-time slicing is performed on a remaining portion of the CAD model (408). For example, the dynamic processor 114 can perform processing for subsequent layers, e.g., in parallel with printing, as shown in FIG. 3.

Pre-processed data, model analysis information or real-time feedback is received during the printing of a respective slice (410). For example, as the first layer 302*a* is being printed, the dynamic processor 114 can receive information associated with printing the first layer 302*a*. Other examples of data, information or feedback include: data associated with a static analysis or a more detailed analysis of the CAD model, sensor data, camera data, print data, or user input (such as from a manual control to adjust print speed).

A next slice is identified for printing including adjusting one or more slicing or instruction parameters based on the received pre-processed data, model analysis information or real-time feedback, wherein adjusting includes adjusting a slicing or instruction parameter for the next slice to be printed by the 3D printer (412). For example, the dynamic processor 114 can identify the second layer 302*b* as the next layer to be printed, and the dynamic processor 114 can adjust printing parameters for the second layer 302*b* based on information received. Printing parameters can include slice generation parameters or instruction generation parameters. Slice generation parameters can include slice thickness. Instruction generation may include as well use of default settings or parameters, which may be adjusted over time and during the print as herein to compensate for real time detected/received input. For example, instruction generation parameters can include print temperature (e.g., to compensate for ambient temperature or other detected conditions), flow rate (rate at which material exists the nozzle), speed of the print head movement, a cleaning parameter (to control timing of cleaning of the nozzle such as after detection of excess material), brightness parameter or other illumination parameter (e.g., to control a brightness pattern of a light source based on detection of a cloudy print window), or an alignment parameter (e.g., to shift a start of print location relative to some point of origin to compensate for misalignment). Other parameters relating to slice generation or for use in generating print instructions are possible.

In some implementations, adjusting one or more slicing parameters can include adjusting a slice thickness based on one or more of CAD model geometry or user input including producing slices having at least two different slice thicknesses when printing the CAD model. For example, the dynamic processor 114 can adjust printing parameters for the second layer 302b so that the slice thickness of the second layer 302b is different from the slice thickness of the first layer 302a.

In some implementations, adjusting the slice thickness can include increasing a slice thickness for a next slice to be greater than a slice thickness for a last printed slice when printing, for example, a wall. For example, the dynamic processor 114 can determine that larger thickness slices 204 can be used in places where the model geometry 202 remains relatively unchanged (e.g., in straight-walled portions).

In some implementations, adjusting the slice thickness can include decreasing a slice thickness for next slice to be less than a slice thickness for a last printed slice when printing, for example, a curve. For example, the dynamic processor 114 can determine that smaller thickness slices 206 can be used, for example, in places where the model geometry 202 changes (e.g., in curves).

In some implementations, user input is received after the start of printing and controls a speed at which a remaining portion of printing occurs, with higher speed resulting in greater thickness slices. For example, as the user watches the printing of a respective slice, the user can provide information that is used by the dynamic processor 114 to control the speed of printing and thicknesses of subsequent slices. Other user inputs can be used to change other aspects of printing.

In some implementations, adjusting one or more slicing parameters can include determining a default setting for at least one of the slicing or instruction generation parameters to print a first slice, and the at least one slicing or instruction generation parameter can be adjusted at a next slice based on feedback obtained during printing or an evaluation of the CAD model. For example, the first layer 302a can be printed using default settings for the printing engine 108. Subsequent slices can use settings that are changed by the dynamic processor 114 based on information received by processing the CAD model 118 and information received from printing previous slices.

Instructions for printing the next slice are generated (414). For example, the dynamic processor 114 can generate the instruction set for the second layer 302b.

The next slice is printed based on the generated instructions and, in parallel, dynamic real-time slicing is repeated to generate a then next slice and associated instructions for printing (416). As an example, the second layer 302b is printed, and during that time, the dynamic processor 114 can determine and generate instructions for the next slice (e.g., the third layer 302c).

In some implementations, the process 400 can include processing an image taken from a camera including identifying one or more calibration errors and adjusting an alignment of a next slice. For example, by analyzing image information captured by a camera during printing the second layer 302b, the dynamic processor 114 can determine that calibration errors (e.g., alignment, spacing) exist. Using this information, the dynamic processor 114 can provide information to the printing engine 108 to correct alignment or other issues.

In some implementations, the process 400 can include identifying one or more delicate features in the CAD model that may result in print unreliability, and adjusting includes increasing a next slice thickness to increase print reliability and accordingly not printing the identified delicate features. As an example, the dynamic processor 114 can determine that small or complicated features in the CAD model 118 may not be printable by the printing engine 108 (e.g., due to constraints or capabilities of a given printer), and that these features should not be attempted by the printing engine 108, as the features fall outside a limited range of acceptable 3D geometry. As a result, the dynamic processor 114 can override a thickness parameter to effectively disregard the complicated features.

In some implementations, the process 400 can include detecting an anomaly in a slice, determining a default configuration for the detected anomaly, and applying the default to the generated instructions to ensure no print error occurs when printing the CAD model. The dynamic processor 114, for example, can determine failure cases associated with a particular slice (e.g., inverted normals, intersecting triangles, self-intersection, non-manifold surfaces, among other errors), and the dynamic processor 114 can automatically account for the failure cases when generating the instruction set for the slice.

Figure 5:
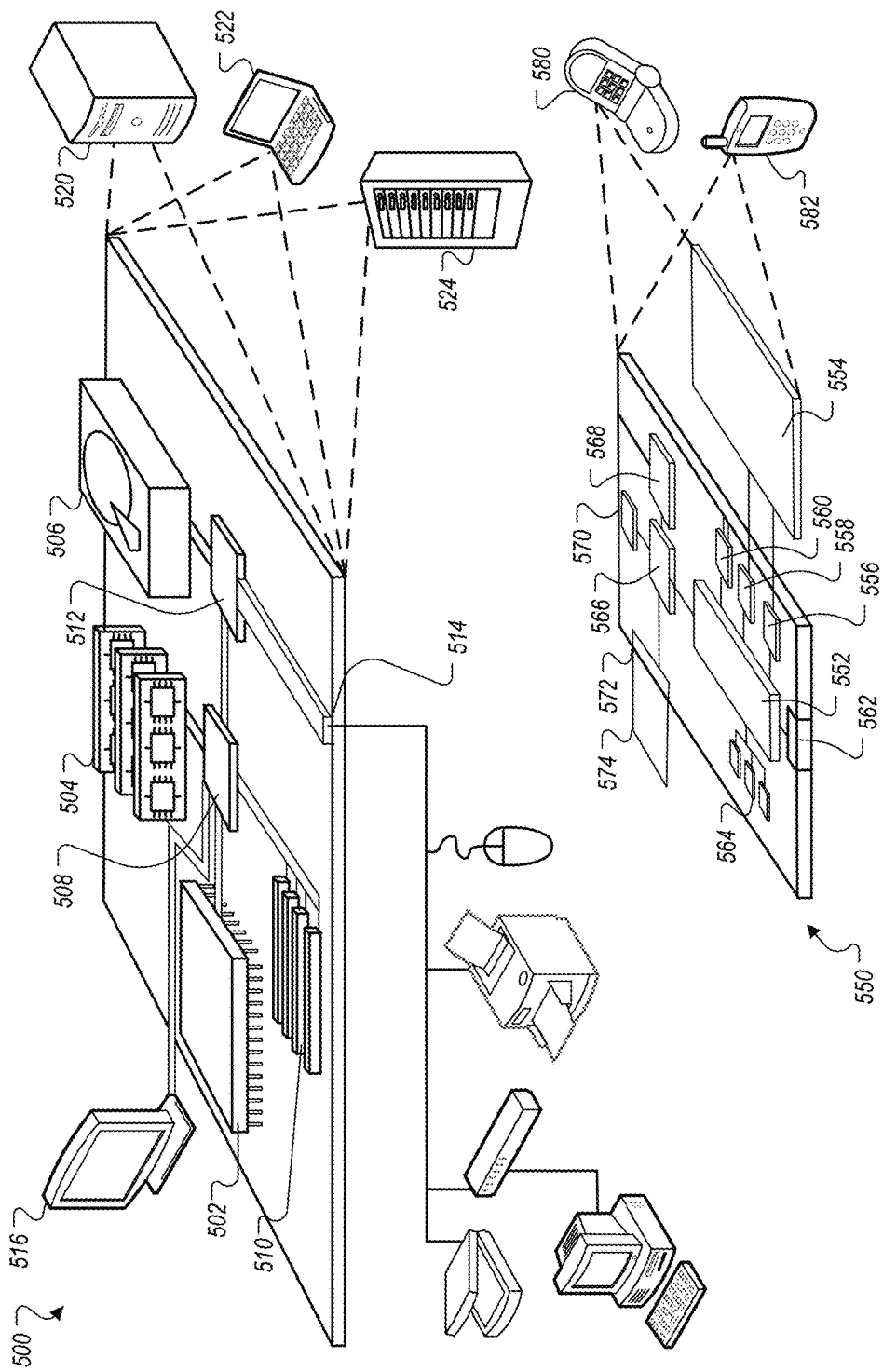
FIG. 5 is a block diagram of an example computer system that can be used to implement the methods, systems and processes described in this disclosure.

FIG. 5 is a block diagram of example computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 500 is further intended to represent any other typically non-mobile devices, such as televisions or other electronic devices with one or more processors embedded therein or attached thereto. Computing device 550 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 500 includes a processor 502, memory 504, a storage device 506, a high-speed controller 508 connecting to memory 504 and high-speed expansion ports 510, and a low-speed controller 512 connecting to low-speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed controller 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low-speed controller 512 manages lower bandwidth-intensive operations. Such allocation of duties is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed bus 514. The low-speed bus 514 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as computing device 550. Each of such devices may contain one or more of computing devices 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The computing device 550 may also be provided with a storage device, such as a micro-drive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the computing device 550, such as control of user interfaces, applications run by computing device 550, and wireless communication by computing device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of computing device 550 with other devices. External interface 562 may provide, for example, for wired communication (e.g., via a docking procedure) or for wireless communication (e.g., via Bluetooth® or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to computing device 550 through expansion interface 572, which may include, for example, a subscriber identification module (SIM) card interface. Such expansion memory 574 may provide extra storage space for computing device 550, or may also store applications or other information for computing device 550. Specifically, expansion memory 574 may include instructions to carry out or supplement the processes described above, and may include secure information also. Thus, for example, expansion memory 574 may be provide as a security module for computing device 550, and may be programmed with instructions that permit secure use of computing device 550. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Computing device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 568 (e.g., a radio-frequency transceiver). In addition, short-range communication may occur, such as using a Bluetooth®, WiFi, or other such transceiver (not shown). In addition, GPS receiver module 570 may provide additional wireless data to computing device 550, which may be used as appropriate by applications running on computing device 550.

Computing device 550 may also communicate audibly using audio codec 560, which may receive spoken information from a user and convert it to usable digital information. Audio codec 560 may likewise generate audible sound for a user, such as through a speaker, e.g., in a handset of computing device 550. Such sound may include sound from voice telephone calls, may include recorded sound (e.g., voice messages, music files, etc.) and may also include sound generated by applications operating on computing device 550.

The computing device 550 may be implemented in a number of different forms, as shown in the figure. For example, it may be implemented as a cellular telephone 580. It may also be implemented as part of a smartphone 582, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for 3D printing without a necessity to pre-process a computer-aided design (CAD) model before delivery to a 3D printer, the method comprising:
receiving, by a 3D printer, a CAD model for a design to be printed by the 3D printer;
processing the CAD model to identify a first slice and generating instructions for printing the first slice;
using the generated instructions to start printing of the CAD model; and
in parallel with the printing, performing dynamic real-time slicing on a remaining portion of the CAD model including:
receiving pre-processed data, model analysis information or real-time feedback during the printing of a respective slice;
identifying a next slice for printing including adjusting one or more slicing parameters based on the received pre-processed data, model analysis information or real-time feedback, wherein adjusting includes adjusting a slicing parameter for the next slice to be printed by the 3D printer, and wherein adjusting one or more slicing parameters further includes adjusting a slice thickness based on one or more of CAD model geometry or user input including slicing at least two different slice thicknesses when printing the CAD model, wherein the user input is received after the start of printing and controls a speed at which a remaining portion of printing occurs, with higher speed resulting in greater thickness slices;
generating instructions for printing the next slice; and
printing the next slice based on the generated instructions and, in parallel, repeating the performing dynamic real-time slicing to generate a then next slice and associated instructions for printing.

2. The method of claim 1, wherein adjusting the slice thickness includes increasing a slice thickness for a next slice to be greater than a slice thickness for a last-printed slice when printing a wall.

3. The method of claim 1, wherein adjusting the slice thickness includes decreasing a slice thickness for a next slice to be less than a slice thickness for a last-printed slice when printing a curve.

4. A method for 3D printing without a necessity to pre-process a computer-aided design (CAD) model before delivery to a 3D printer, the method comprising:
receiving, by a 3D printer, a CAD model for a design to be printed by the 3D printer;
processing the CAD model to identify a first slice and generating instructions for printing the first slice;
using the generated instructions to start printing of the CAD model; and
in parallel with the printing, performing dynamic real-time slicing on a remaining portion of the CAD model including:
receiving pre-processed data, model analysis information or real-time feedback during the printing of a respective slice;
identifying a next slice for printing including adjusting one or more slicing parameters based on the received pre-processed data, model analysis information or real-time feedback, wherein adjusting includes adjusting a slicing parameter for the next slice to be printed by the 3D printer;
identifying one or more delicate features in the CAD model that may result in print unreliability, and wherein adjusting the one or more slicing parameters includes increasing a next slice thickness to increase print reliability and accordingly not printing the identified one or more delicate features;
generating instructions for printing the next slice; and
printing the next slice based on the generated instructions and, in parallel, repeating the performing dynamic real-time slicing to generate a then next slice and associated instructions for printing.

5. The method of claim 4, further comprising processing an image taken from a camera including identifying one or more calibration errors and adjusting an alignment of a next slice.

6. A method for 3D printing without a necessity to pre-process a computer-aided design (CAD) model before delivery to a 3D printer, the method comprising:
receiving, by a 3D printer, a CAD model for a design to be printed by the 3D printer;
processing the CAD model to identify a first slice and generating instructions for printing the first slice;
using the generated instructions to start printing of the CAD model;
in parallel with the printing, performing dynamic real-time slicing on a remaining portion of the CAD model including:
receiving pre-processed data, model analysis information or real-time feedback during the printing of a respective slice;
identifying a next slice for printing including adjusting one or more slicing parameters based on the received pre-processed data, model analysis information or real-time feedback, wherein adjusting includes adjusting a slicing parameter for the next slice to be printed by the 3D printer;
generating instructions for printing the next slice; and
printing the next slice based on the generated instructions and, in parallel, repeating the performing dynamic real-time slicing to generate a then next slice and associated instructions for printing; and
detecting an anomaly in a slice, determining a default configuration for the detected anomaly, and applying the default configuration to the generated instructions to ensure no print error occurs when printing the CAD model.

7. The method of claim 6, wherein adjusting the one or more slicing parameters includes determining a default setting for at least one of the slicing parameters to print a first slice, and adjusting the at least one slicing parameter at a next slice based on feedback obtained during printing or an evaluation of the CAD model.

8. A non-transitory computer-readable medium storing instructions that, when executed, cause one or more processors to perform operations for 3D printing without a necessity to pre-process a computer-aided design (CAD) model before delivery to a 3D printer, the operations comprising:
receiving, by a 3D printer, a CAD model for a design to be printed by the 3D printer;
processing the CAD model to identify a first slice and generating instructions for printing the first slice;
using the generated instructions to start printing of the CAD model; and
in parallel with the printing, performing dynamic real-time slicing on a remaining portion of the CAD model including:
receiving pre-processed data, model analysis information or real-time feedback during the printing of a respective slice;
identifying a next slice for printing including adjusting one or more slicing parameters based on the received pre-processed data, model analysis information or real-time feedback, wherein adjusting includes adjusting a slicing parameter for the next slice to be printed by the 3D printer, and wherein adjusting one or more slicing parameters further includes adjusting a slice thickness based on one or more of CAD model geometry or user input including slicing at least two different slice thicknesses when printing the CAD model, wherein the user input is received after the start of printing and controls a speed at which a remaining portion of printing occurs, with higher speed resulting in greater thickness slices;
generating instructions for printing the next slice; and
printing the next slice based on the generated instructions and, in parallel, repeating the performing dynamic real-time slicing to generate a then next slice and associated instructions for printing.

9. The non-transitory computer-readable medium of claim 8, wherein adjusting the slice thickness includes increasing a slice thickness for a next slice to be greater than a slice thickness for a last-printed slice when printing a wall.

10. The non-transitory computer-readable medium of claim 8, wherein adjusting the slice thickness includes decreasing a slice thickness for a next slice to be less than a slice thickness for a last-printed slice when printing a curve.

11. A non-transitory computer-readable medium storing instructions that, when executed, cause one or more processors to perform operations for 3D printing without a necessity to pre-process a computer-aided design (CAD) model before delivery to a 3D printer, the operations comprising:
   receiving, by a 3D printer, a CAD model for a design to be printed by the 3D printer;
   processing the CAD model to identify a first slice and generating instructions for printing the first slice;
   using the generated instructions to start printing of the CAD model; and
   in parallel with the printing, performing dynamic real-time slicing on a remaining portion of the CAD model including:
      receiving pre-processed data, model analysis information or real-time feedback during the printing of a respective slice;
      identifying a next slice for printing including adjusting one or more slicing parameters based on the received pre-processed data, model analysis information or real-time feedback, wherein adjusting includes adjusting a slicing parameter for the next slice to be printed by the 3D printer;
      identifying one or more delicate features in the CAD model that may result in print unreliability, and wherein adjusting the one or more slicing parameters includes increasing a next slice thickness to increase print reliability and accordingly not printing the identified one or more delicate features;
      generating instructions for printing the next slice; and
      printing the next slice based on the generated instructions and, in parallel, repeating the performing dynamic real-time slicing to generate a then next slice and associated instructions for printing.

12. The non-transitory computer-readable medium of claim 11, wherein the operations comprise processing an image taken from a camera including identifying one or more calibration errors and adjusting an alignment of a next slice.

13. A non-transitory computer-readable medium storing instructions that, when executed, cause one or more processors to perform operations for 3D printing without a necessity to pre-process a computer-aided design (CAD) model before delivery to a 3D printer, the operations comprising:
   receiving, by a 3D printer, a CAD model for a design to be printed by the 3D printer;
   processing the CAD model to identify a first slice and generating instructions for printing the first slice;
   using the generated instructions to start printing of the CAD model;
   in parallel with the printing, performing dynamic real-time slicing on a remaining portion of the CAD model including:
      receiving pre-processed data, model analysis information or real-time feedback during the printing of a respective slice;
      identifying a next slice for printing including adjusting one or more slicing parameters based on the received pre-processed data, model analysis information or real-time feedback, wherein adjusting includes adjusting a slicing parameter for the next slice to be printed by the 3D printer;
      generating instructions for printing the next slice; and
      printing the next slice based on the generated instructions and, in parallel, repeating the performing dynamic real-time slicing to generate a then next slice and associated instructions for printing; and
   detecting an anomaly in a slice, determining a default configuration for the detected anomaly, and applying the default configuration to the generated instructions to ensure no print error occurs when printing the CAD model.

14. The non-transitory computer-readable medium of claim 13, wherein adjusting the one or more slicing parameters includes determining a default setting for at least one of the slicing parameters to print a first slice, and adjusting the at least one slicing parameter at a next slice based on feedback obtained during printing or an evaluation of the CAD model.

* * * * *